US010200396B2

(12) United States Patent
Kominar

(10) Patent No.: US 10,200,396 B2
(45) Date of Patent: Feb. 5, 2019

(54) MONITORING PACKET ROUTES

(71) Applicant: BlackBerry Limited, Waterloo (CA)

(72) Inventor: Jeremy Lawson Kominar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 179 days.

(21) Appl. No.: 15/091,520

(22) Filed: Apr. 5, 2016

(65) Prior Publication Data

US 2017/0289190 A1    Oct. 5, 2017

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(52) U.S. Cl.
CPC .............................. H04L 63/1433 (2013.01)

(58) Field of Classification Search
None
See application file for complete search history.

(56) References Cited

U.S. PATENT DOCUMENTS

| 5,317,570 A * | 5/1994 | Ochiai ................ H04L 12/5602 370/234 |
| 7,113,599 B2 | 9/2006 | Neves et al. |
| 7,299,489 B1 | 11/2007 | Branigan et al. |
| 7,580,981 B1 * | 8/2009 | Golub ................... G06Q 10/107 709/206 |
| 8,363,650 B2 | 1/2013 | Rao et al. |
| 8,549,081 B2 * | 10/2013 | Leiba ................... G06Q 10/107 709/206 |
| 8,725,852 B1 | 5/2014 | Boddu et al. |
| 9,722,919 B2 * | 8/2017 | Gagliano ............ H04L 67/2819 |
| 2002/0116669 A1 | 8/2002 | Jain |
| 2003/0018769 A1 * | 1/2003 | Foulger .................. G06Q 30/02 709/223 |
| 2007/0016670 A1 * | 1/2007 | Cooper ................. H04L 43/026 709/224 |

(Continued)

FOREIGN PATENT DOCUMENTS

EP    0955749    11/1999

OTHER PUBLICATIONS

OS Monitor—Android Apps on Google Play; retrieved from https://play.google.com/store/apps/details?id=com.eolwral.osmonitor&hl=en on Mar. 17, 2016; 4 pages.

*Primary Examiner* — Lynn D Feild
*Assistant Examiner* — Vadim Savenkov
(74) *Attorney, Agent, or Firm* — Fish & Richardson P.C.

(57) ABSTRACT

Systems, methods, and software can be used to share content. In some aspect, an address associated with a packet is identified at an electronic device. The address is associated with a node on a traverse path of the packet. The address is compared with a list of one or more addresses associated with a security risk. The node is determined to have a security risk based on the address matching an address in the list of one or more addresses. In response to determining, a notification is outputted at the electronic device. The notification indicates that the traverse path of the packet has a security risk.

8 Claims, 2 Drawing Sheets

(56) References Cited

U.S. PATENT DOCUMENTS

| | | | |
|---|---|---|---|
| 2008/0244739 A1* | 10/2008 | Liu | H04L 63/1458 726/22 |
| 2009/0133122 A1* | 5/2009 | Koo | H04L 63/1416 726/23 |
| 2011/0126259 A1* | 5/2011 | Krishnamurthi | H04L 43/026 726/1 |
| 2014/0130160 A1* | 5/2014 | Golovanov | H04L 63/1441 726/23 |
| 2014/0245435 A1* | 8/2014 | Belenky | H04L 63/1458 726/22 |
| 2015/0026794 A1 | 1/2015 | Zuk et al. | |
| 2015/0207728 A1* | 7/2015 | Gagliano | H04L 45/44 370/254 |
| 2016/0308739 A1* | 10/2016 | Benjamin | H04L 41/12 |

* cited by examiner

MONITORING PACKET ROUTES

BACKGROUND

The present disclosure relates to monitoring packet routes. In some cases, electronic devices, including mobile devices, or other computer systems, can send or receive data over a network. In some cases, the data is sent or received in units of packets. Each packet traverses over a path from a source node in the network to a destination node of in the network. In some cases, the traverse path of a packet can be referred to as a route of the packet.

DESCRIPTION OF DRAWINGS

Like reference numbers and designations in the various drawings indicate like elements.

DETAILED DESCRIPTION

In some cases, the traverse path of the packet includes one or more intermediate nodes. In some cases, at least one of the nodes on the traverse path, e.g., the source node, the destination node, or an intermediate node, or any combination thereof, may have security risks. Examples of the nodes include a server, a router, a relay, a mobile device, or any other electronic device that transmits packets over a network. In one example, one of the nodes may be an imposter node that is set up by an attacker. In another example, one of the nodes may be a surveillance node that is controlled by a private organization or a government entity. In some cases, the imposter node or the surveillance node can intercept the packet, obtain information in the packet, obtain security credentials from the packet, or a combination thereof. These operations may compromise not only the security of the information in the packet, but also the security of the electronic device and other devices that are connected with the electronic device over the network.

In some cases, a firewall can be implemented to provide some security for packet routes. In some cases, a firewall can be configured to filter incoming packets based on a port number. For example, any incoming packets having a configured port number may be blocked by the firewall. However, a firewall may not monitor the traverse path of an incoming or outgoing packet. Therefore, a firewall may not be used to determine whether a traverse path of a packet has a security risk. Furthermore, a firewall may block any packets with the configured port number without any user inputs.

In some cases, a traverse path between a source node and a destination node can change over time. In one example, there may be a network congestion at some nodes and the path may be changed by network optimization procedures. Alternatively or in combination, a node on the traverse path may fail and a different path may be selected to circumvent the faulty node.

Figure 1:
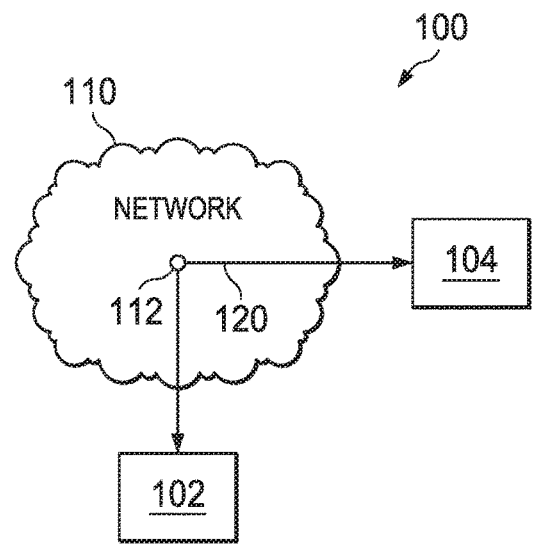
FIG. 1 is an example communication system that monitors packet routes.
Figure 2:
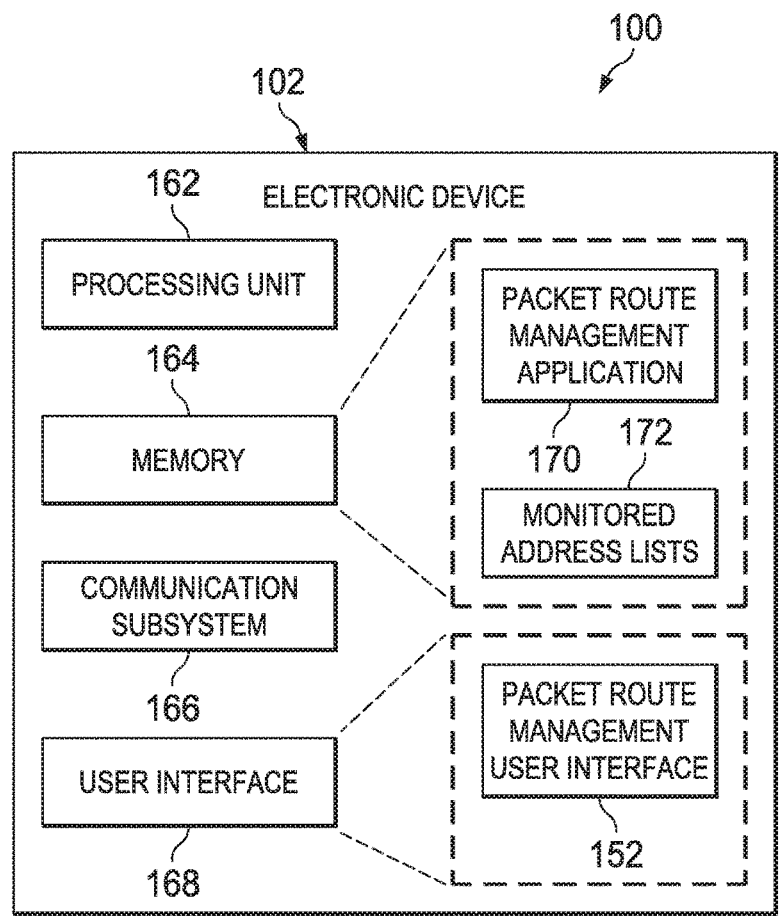
FIG. 2 is a schematic diagram showing the electronic device that monitors packet routes.
Figure 3:
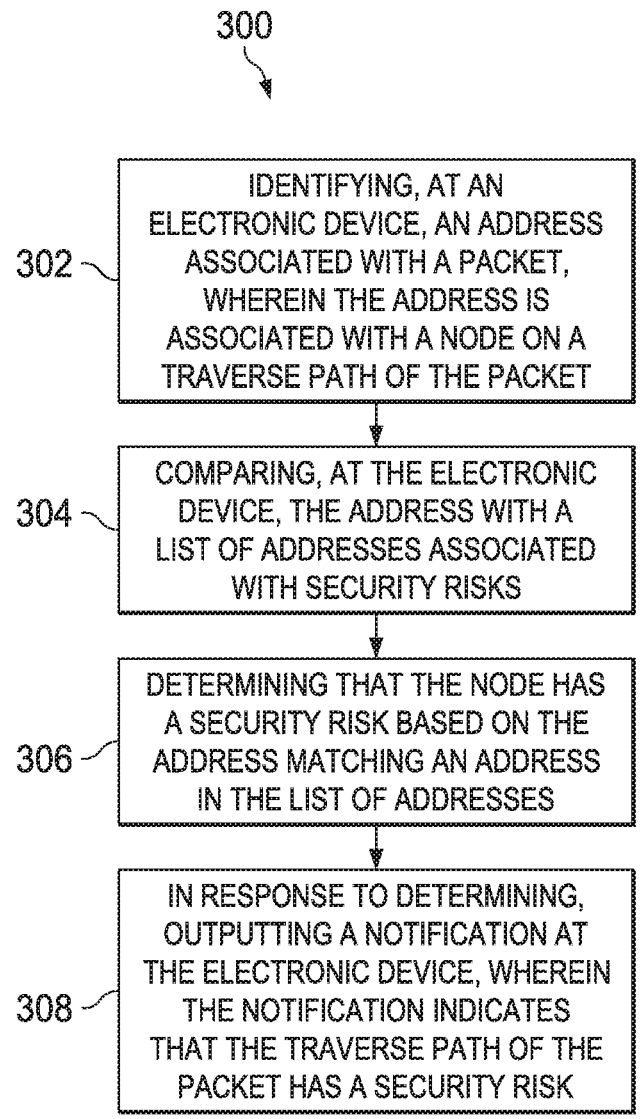
FIG. 3 is a flow diagram showing an example process for monitoring packet routes.

In some cases, a traverse path of an incoming or outgoing packet can be monitored dynamically on an electronic device. A list of one or more addresses associated with a security risk can be stored on the electronic device. An address of a node on the traverse path can be compared with the list, to determine whether the node has a security risk. If a traverse path is determined to have a security risk, a notification can be outputted on the electronic device to indicate the security risk. In some cases, a user action can be taken in response to the notification. FIGS. 1-3 and associated descriptions provide additional details of these implementations.

FIG. 1 is an example communication system 100 that monitors packet routes. At a high level, the example communication system 100 includes electronic devices 102 and 104 that are communicably coupled over a network 110. As shown in FIG. 1, a traverse path 120 connects the electronic devices 102 and 104. An electronic device, e.g., the electronic devices 102 and 104, represents a device that sends and receives packets over the network 110. For example, the electronic device 102 can send a packet over the traverse path 120 to the electronic device 104. The electronic device 102 can also receive a packet from the electronic device 104 over the traverse path 120. In some cases, a packet sent from the electronic device 102 to the electronic device 104 can travel on a path that is different than a packet received at the electronic device 102 from the electronic device 104. In some cases, an electronic device, e.g., the electronic device 102, can be configured to monitor packet routes. FIGS. 2-3 and associated descriptions provide additional details of these implementations.

The traverse path 120 includes one or more intermediate nodes 112. The intermediate nodes 112 represent an electronic device that receives a packet from a previous hop on the traverse path 120 and forwards the packet to the next hop on the traverse path 120.

The example communication system 100 includes the network 110. The network 110 represents an application, set of applications, software, software modules, hardware, or combination thereof that can be configured to transmit packets from a source node to a destination node. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

In operation, the electronic device 102 can monitor packets received over the traverse path 120, packets to be sent over the traverse path 120, or a combination thereof. The electronic device 102 can determine whether there is a node on the traverse path, e.g., the source node for an incoming packet, the destination node for an outgoing packet, or the intermediate node 112, has a security risk. An indication can be outputted on the electronic device if a security risk is determined. User inputs can be requested for further user actions.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. FIGS. 2-3 and associated descriptions provide additional details of these implementations.

FIG. 2 is a schematic diagram 200 showing the electronic device 102 that monitors packet routes. The electronic device 102 includes a processing unit 162, a communication subsystem 166, a user interface 168, and a memory 164. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 162 can be configured to generate control information, such as a measurement report, or respond to received information, such as control information from a network node. In some cases, the processing unit 162 can also be configured to make a radio resource management (RRM) decision, such as cell selection/reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 2, the example user interface 168 can be configured to output one or more packet route management user interfaces 152. The packet route management user interfaces 152 can include user interfaces that indicate a packet route has a security risk and enable the user to select a responsive actions. FIG. 3 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of electronic device 102 and various other computer-executable software programs for performing one or more of the processes, steps, or actions described above.

As shown in FIG. 2, the example memory 164 can include a packet route management application 170. The packet route management application 170 represents an application, set of applications, software, software modules, hardware, or combination thereof that can be configured to monitor packet routes and output status indication regarding security risks on a traverse path of a packet. FIG. 3 and associated descriptions provide additional details of these implementations.

In some cases, the packet route management application 170 can be implemented as part of the operating system of the electronic device 102. Alternatively or in combination, the packet route management application 170 can be implemented as part of a security management application that runs on the electronic device 102. In some cases, the security management application can monitor one or more security sensors and output warnings if a security sensor is triggered. Examples of the security sensors include access to one or more configured resources, e.g., camera, microphone, location determination module, files. In some cases, if an application accesses a configured resource, the security sensor corresponding to the configured resource can be triggered. In some cases, after a security sensor is triggered, an indication can be outputted on the electronic device 102 to alert the user about the access. Alternatively or in combination, after a security sensor is triggered, the event that triggers the security sensor, e.g., the access to the configured resource, can be logged in a record. The record can also include information related to event, including, e.g., the time, the duration, and the location of the electronic device 102 when the event is triggered. A user can review the record and take action accordingly. For example, a user can change the access authorization of an application to a particular resource.

In some cases, the packet route management application 170 can configure one or more security sensors related to packet routes. The packet route management application 170 can determine if there is a security risk associated with a traverse path of a packet. FIG. 3 and associated descriptions provide additional details of determining a security risk associated with a traverse path of a packet. If the packet route management application 170 determines that there is a security risk associated with a traverse path of a packet, a corresponding security sensor can be triggered. In some cases, the event can be logged and the user can review the record later. Alternatively or in combination, a status indication can be outputted at the electronic device 102 in response to the event, and a user can take corresponding actions. FIG. 3 and associated descriptions provide additional details of the status indication and related implementations.

As shown in FIG. 2, the example memory 164 can include one or more monitored address lists 172. The monitored address list 172 represents a file, an application, a set of applications, software, software modules, hardware, or combination thereof that can be configured to store addresses of nodes that have a security risk. The monitored address list 172 can be configured by a user of the electronic device, a system administrator, or a combination thereof. In some cases, the monitored address list 172 can be generated, pushed, or updated by an enterprise mobility management (EMM) server. FIG. 3 and associated descriptions provide additional details of the monitored address list 172 and related implementations.

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 3 is a flow diagram showing an example process 300 for monitoring packet routes. The process 300 can be implemented by an electronic device, e.g., the electronic device 102 shown in FIGS. 1-2. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, where an address associated with a packet is identified. In some cases, the address is associated with a node on a traverse path of the packet. In some cases, the packet can be an incoming packet that is received by the electronic device. In these or other cases, a header of the packet can be inspected. The header of the packet can include a source address of the packet. In some cases, the source address can indicate the address of the node that represents the beginning point of the traverse path of the packet, e.g., the node that generates the packet and sends the packet to the electronic device. Therefore, the source address can be evaluated to determine if the node that initiates the transmission of the packet has a security risk.

In some cases, the packet can be an outgoing packet to be transmitted by the electronic device. In these or other cases, a header of the packet can be inspected prior to the transmission of the packet. The header of the packet can include a destination address of the packet. In some cases, the destination address can indicate the address of a node that represents the end point of the traverse path of the packet, e.g., the target receiver of the packet. Therefore, the destination address can be evaluated to determine if the node that receives the packet has a security risk.

In some cases, a packet route tracer tool can be used to discover a traverse path of a packet prior to transmitting the packet. A packet route tracer tool can be used to discover one or more intermediate nodes on the traverse path of the packet. Examples of the packet route tracer tool include TRACERT. In one example, the header of the packet can be inspected prior to the transmission. The destination address of the packet can be obtained. A trace request can be sent to the destination address of the packet to discover a traverse path that may be used to deliver the packet. In response to the trace request, one or more addresses can be received. Each of the received addresses can be associated with a node on the traverse path. These received addresses can include addresses associated with the beginning point, the end point, and the intermediate points of the traverse path. Therefore, these addresses can be evaluated to determine if any of the intermediate nodes that receive the packet have a security risk.

In some cases, a traverse path of a packet can change from time to time due to network congestions or faults. In some cases, the packet tracer tool can be used periodically to discover the traverse path due to these changes. In one example, one or more timers can be maintained. In some cases, each timer can be associated with a destination address. The timer can be set to a configured time period. For example, the configured time period can be a minute, an hour, a day, or any other time period. In operation, once a traverse path to a destination address is discovered, the timer starts to run. If the electronic device sends another packet to the same destination address before the timer expires, the same traverse path can be assumed as the path that is used to deliver the packet. If the electronic device sends another packet to the same destination address after the timer expires, the packet tracer tool can be used again to discover whether the traverse path has changed. In some cases, if the traverse path has changed, the addresses of the new nodes on the traverse path can be evaluated to determine whether the new nodes have security risks.

Alternatively or in combination, the packet tracer tool can be used after an occurrence of a configured event. Examples of the configured events can include the booting of the electronic device, the initiation of an application that is configured for packet route monitoring, and a change of a routing table stored on the electronic device. In some cases, the occurrence of the configured event can trigger the electronic device to use the packet tracer tool to discover a traverse path to a configured destination device for packet route monitoring.

In some cases, one or more applications on the electronic device can be configured for packet route monitoring. The applications to be monitored can be configured by the user of the electronic device, a system administrator, or a combination thereof. In some cases, a user interface can be outputted on the electronic device. A user interface can include one or more user interface objects to provide user inputs. The user can use the user interface objects to select applications for packet route monitoring. Examples of user interface objects include screens, dialogue boxes, icons, buttons, bars, menus, or any other user interface objects. User inputs can be received through a voice command, key press, touch, click, swipe, or any other gesture or input that is associated with one or more user interface actions. Alternatively or in combination, the applications to be monitored can be configured by an enterprise mobility management (EMM) server. The EMM server represents an application, set of applications, software, software modules, hardware, or combination thereof that can be configured to manage applications and devices for an enterprise. For example, the EMM server can install, update, and manage the license of enterprise applications for the electronic device. In some cases, the EMM server can send a configuration file to the electronic device to configure one or more applications, e.g., enterprise applications that may access the resources associated with the enterprise, for packet route monitoring.

In some cases, if an application is configured for packet route monitoring, the incoming packets received by the application, the outgoing packets to be sent by the application, or a combination thereof can be inspected to identify the traverse path of the packets. In some cases, if an application is configured for packet route monitoring, the packet tracer tool can be used periodically and independent of whether there is a pending packet to be transmitted. For example, if the application establishes an active communication channel with another entity, e.g., a server, through the network, the packet tracer tool can be used periodically to evaluate whether any nodes on the active communication channel between the electronic device and the server have security risks, even when there is not a pending packet to be transmitted.

From 302, the process 300 proceeds to 304, where the address identified at 302 is compared with a list of one or more addresses associated with a security risk. In some cases, a black list can be stored on the electronic device. The black list can include one or more addresses associated with one or more nodes having a security risk. Examples of the one or more addresses in the black list can include Internet Protocol (IP) addresses, Uniform Resource Locators (URLs), or a combination thereof. In some cases, the black list can be configured by a user through a user interface, configured by an EMM server, e.g., using a configuration file discussed previously, or a combination thereof.

In some cases, the one or more addresses in the black list can be configured based on user input. In one example, a user can indicate, by user input, one or more regions or organizations that have security risks. Examples of the regions can include a country, a state, and a geographic area. Example of the organizations can include a commercial entity, a non-commercial entity, and a government entity. The addresses associated with a node in the configured regions or organizations can be included in the black list. In another example, a user can indicate, by user input, a website or an Internet domain. The addresses associated with the website and the Internet domain can be included in the black list. In some cases, a Domain Name Service (DNS) or any other address servers can be queried to obtain the addresses associated with the configured regions, organizations, websites, or domains.

From 304, the process 300 proceeds to 306, where whether the node has a security risk is determined. In some cases, if the address associated with the node is included in the black list, the node can be determined to have a security risk.

From 306, the process 300 proceeds to 308, where a notification is outputted at the electronic device in response to determining that the node has a security risk. In some cases, the notification can be a status indication that indicates a traverse path of the packet has a security risk. For example, a bulb with a particular color can be outputted on the electronic device as the status indication. In some cases, the bulb can be configured for a first color, e.g., green, if no security risk associated with the traverse path of the packet is detected. The bulb can turn to a second color, e.g., red, if a security risk associated with the traverse path is discovered.

In some cases, the user interface can provide additional information to the user about the security risks of the traverse path. For example, the address associated with the node having the security risk can be outputted at the electronic device. Alternatively or in combination, the name of the region, organization, website, or domain associated with the node can be outputted at the electronic device. In some cases, the user interface can enable the user to select a user action for the packet with a traverse path that has a security risk. For example, the user interface can indicate that a receiving packet has a security risk and request the user to select whether to accept the packet or discard the packet. The user interface can also indicate that an outgoing packet has a security risk and request the user to select whether to continue to send the packet, discard the packet, or send the packet at a later time.

In some cases, e.g., if the status indication discussed above indicates that a traverse path of a packet has a security risk, a user interface can be outputted on the electronic device to enable the user to modify a routing table. A routing table can include one or more routing configuration settings that configure how a packet travels over a network. In some cases, a routing table can be configured for the electronic device. Alternatively or in combination, an application-specific routing table can be configured for one or more applications on the electronic device. A user can modify the routing table to avoid a node that has a security risk.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
    prior to transmitting a packet, identifying, by at least one hardware processor at an electronic device, a destination address of the packet to be transmitted;
    in response to identifying the destination address of the packet to be transmitted, determining whether a timer associated with the identified destination address has expired;
    in response to determining that the timer associated with the identified destination address has expired, sending, from the electronic device, a tracer request to the destination address of the packet;
    in response to the tracer request, receiving, a tracer response indicates an address of at least one intermediate node on a traverse path between the electronic device and the destination address;
    comparing, by the at least one hardware processor at the electronic device, the address of the at least one intermediate node with a list of one or more addresses associated with a security risk;
    determining, by the at least one hardware processor, that the at least one intermediate node has a security risk based on the comparing; and
    in response to the determining, outputting, by the at least one hardware processor, a notification at the electronic device, wherein the notification indicates that the traverse path of the packet has a security risk.

2. The method of claim 1, further comprising:
    outputting, at the electronic device, a user interface, wherein the user interface requests a user input; and
    discarding the packet in response to the user input.

3. The method of claim 1, further comprising:
    outputting, at the electronic device, a user interface for configuring the list of one or more addresses associated with a security risk;
    receiving, at the electronic device, a user input indicating a region or an organization;
    identifying an address associated with a node of the region or the organization; and
    including the identified address in the list of one or more addresses associated with a security risk.

4. An electronic device, comprising:
    a memory; and at least one hardware processor communicatively coupled with the memory and configured to:
  prior to transmitting a packet, identify, at the electronic device, a destination address of the packet to be transmitted;
  in response to identifying the destination address of the packet to be transmitted, determine whether a timer associated with the identified destination address has expired;
  in response to determining that the timer associated with the identified destination address has expired, send, from the electronic device, a tracer request to the destination address of the packet;
  in response to the tracer request, receive, a tracer response indicates an address of at least one intermediate node on a traverse path between the electronic device and the destination address;
  compare, at the electronic device, the address of the at least one intermediate node with a list of one or more addresses associated with a security risk;
  determine that the at least one intermediate node has a security risk based on the comparing; and
  in response to the determining, output a notification at the electronic device, wherein the notification indicates that the traverse path of the packet has a security risk.

5. The electronic device of claim 4, wherein the at least one hardware processor is configured to:
  output, at the electronic device, a user interface, wherein the user interface requests a user input; and
  discard the packet in response to the user input.

6. The electronic device of claim 4, wherein the at least one hardware processor is configured to:
  output, at the electronic device, a user interface for configuring the list of one or more addresses associated with a security risk;
  receive, at the electronic device, a user input indicating a region or an organization;
  identify an address associated with a node of the region or the organization; and
  include the identified address in the list of one or more addresses associated with a security risk.

7. A non-transitory computer-readable medium containing instructions which, when executed, cause a computing device to perform operations comprising:
  prior to transmitting a packet, identifying, at an electronic device, a destination address of the packet to be transmitted;
  in response to identifying the destination address of the packet to be transmitted, determining whether a timer associated with the identified destination address has expired;
  in response to determining that the timer associated with the identified destination address has expired, sending, from the electronic device, a tracer request to the destination address of the packet;
  in response to the tracer request, receiving, a tracer response indicates an address of at least one intermediate node on a traverse path between the electronic device and the destination address;
  comparing, at the electronic device, the address of the at least one intermediate node with a list of one or more addresses associated with a security risk;
  determining that the at least one intermediate node has a security risk based on the comparing; and
  in response to the determining, outputting a notification at the electronic device, wherein the notification indicates that the traverse path of the packet has a security risk.

8. The non-transitory computer-readable medium of claim 7, wherein the operations comprise:
  outputting, at the electronic device, a user interface, wherein the user interface requests a user input; and
  discarding the packet in response to the user input.

* * * * *